United States Patent [19]

Hanchett, Jr.

[11] 3,858,094
[45] Dec. 31, 1974

[54] ELECTRIC SYSTEM INCLUDING TWO LOADS ARRANGED REMOTELY FROM EACH OTHER

[76] Inventor: Leland J. Hanchett, Jr., 211 Ridge St., Winchester, Mass. 01890

[22] Filed: Dec. 26, 1973

[21] Appl. No.: 428,510

[52] U.S. Cl............... 317/137, 307/12, 307/38, 317/148.5 B, 340/147 R, 340/176
[51] Int. Cl. ........................................ H01h 47/00
[58] Field of Search ............ 340/147 R, 147 B, 160, 340/161, 226, 287, 298, 176, 151; 307/113, 114, 115, 11, 12, 38–41, 140; 317/137, 149, 148.5 B

[56] References Cited
UNITED STATES PATENTS

| | | | |
|---|---|---|---|
| 2,888,664 | 5/1959 | Threadgold | 340/160 |
| 3,416,000 | 12/1968 | Naber | 317/148.5 B |

FOREIGN PATENTS OR APPLICATIONS

| | | | |
|---|---|---|---|
| 1,023,702 | 3/1953 | France | 340/176 |
| 337,896 | 11/1930 | Great Britain | 340/176 |

Primary Examiner—J. D. Miller
Assistant Examiner—Harry E. Moose, Jr.
Attorney, Agent, or Firm—Erwin Salzer

[57] ABSTRACT

Two loads arranged remotely from each other are controlled by circuitry allowing to energize selectively either one or both loads, or either of the loads, from a common a-c power supply.

12 Claims, 4 Drawing Figures

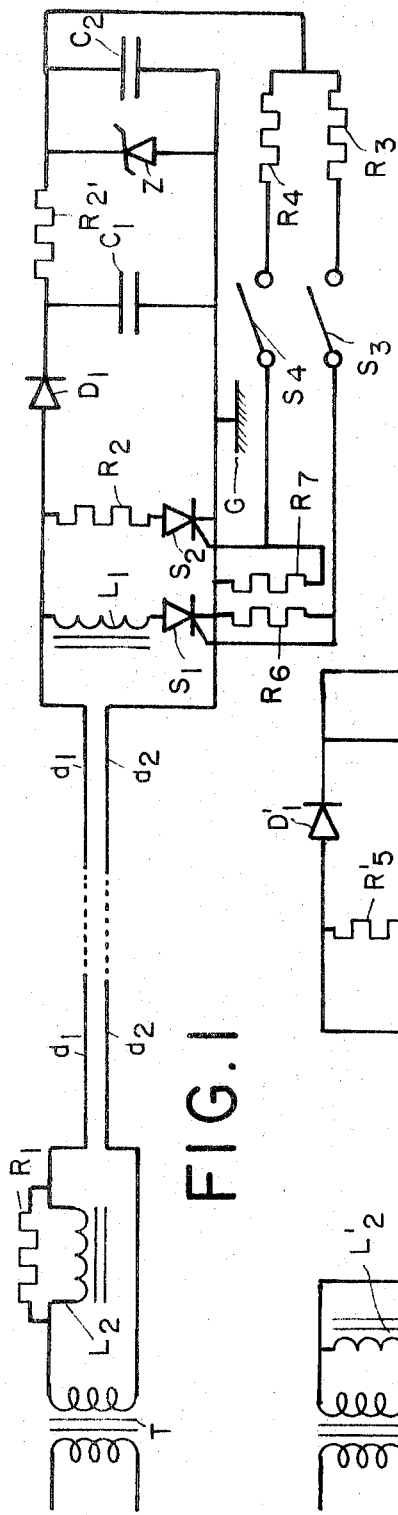
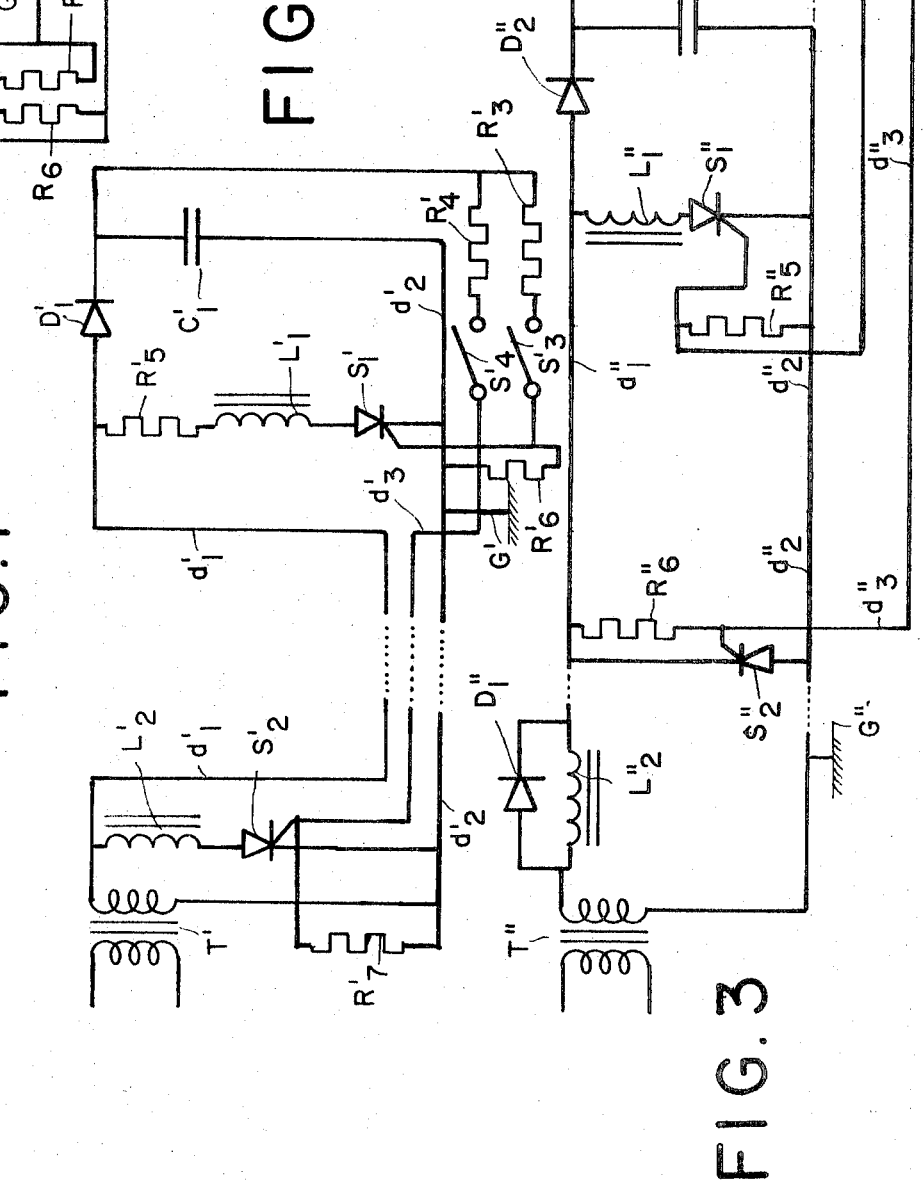
FIG. 1
FIG. 2
FIG. 3

3,858,094

ELECTRIC SYSTEM INCLUDING TWO LOADS ARRANGED REMOTELY FROM EACH OTHER

BACKGROUND OF THE INVENTION

There are instances where two loads which are arranged remotely from each other and intended to be energized selectively may readily be energized by a common a-c power supply, e.g. a common transformer. There are instances, on the other hand, where under such conditions the use of a common a-c power supply or transformer was impractical, heretofore. One instance where under such conditions the use of a common transformer was impractical heretofore is the common door bell or door chime, and the electric door opener or door-latch-operating solenoid. Heretofore these devices could hardly be energized by the same a-c power supply. This invention provides a simple electric system requiring a minimum of wiring which allows selective energization of either one or both of two remote loads, or selective energization of either of two remote loads, by a common a-c power supply or transformer.

SUMMARY OF THE INVENTION

An electric system embodying this invention includes a power supply transformer having a primary circuit and a secondary circuit, and a first load and a second load both energized by said secondary circuit of said transformer. The system further includes a first and a second solid state switch each having a control circuit. These switches are preferably thyristors having trigger circuits. Said first solid state switch is arranged in series with said first load and said second solid state switch is arranged in series with said second load. The system further includes a rectifier energized by said secondary circuit of said transformer and a third switch and a fourth switch. Said third switch is connected to apply a signal derived from the output voltage of said rectifier to said control circuit of said first solid state switch and said fourth switch is connected to apply a signal derived from the output voltage of said rectifier to said control circuit of said second solid state switch.

Preferably said first solid state switch is arranged in the secondary circuit of the transformer so as to allow but positive current pulses to flow through said first load, and said second solid state switch is arranged in the secondary circuit of said transformer so as to allow but negative current pulses to flow through said second load.

BRIEF DESCRIPTION OF THE DRAWINGS

FIG. 1 is a circuit diagram of a first embodiment of this invention;

FIG. 2 is a circuit diagram of another embodiment of this invention;

FIG. 3 is a circuit diagram of still another embodiment of the invention; and

DESCRIPTION OF PREFERRED EMBODIMENTS

Figure 4:
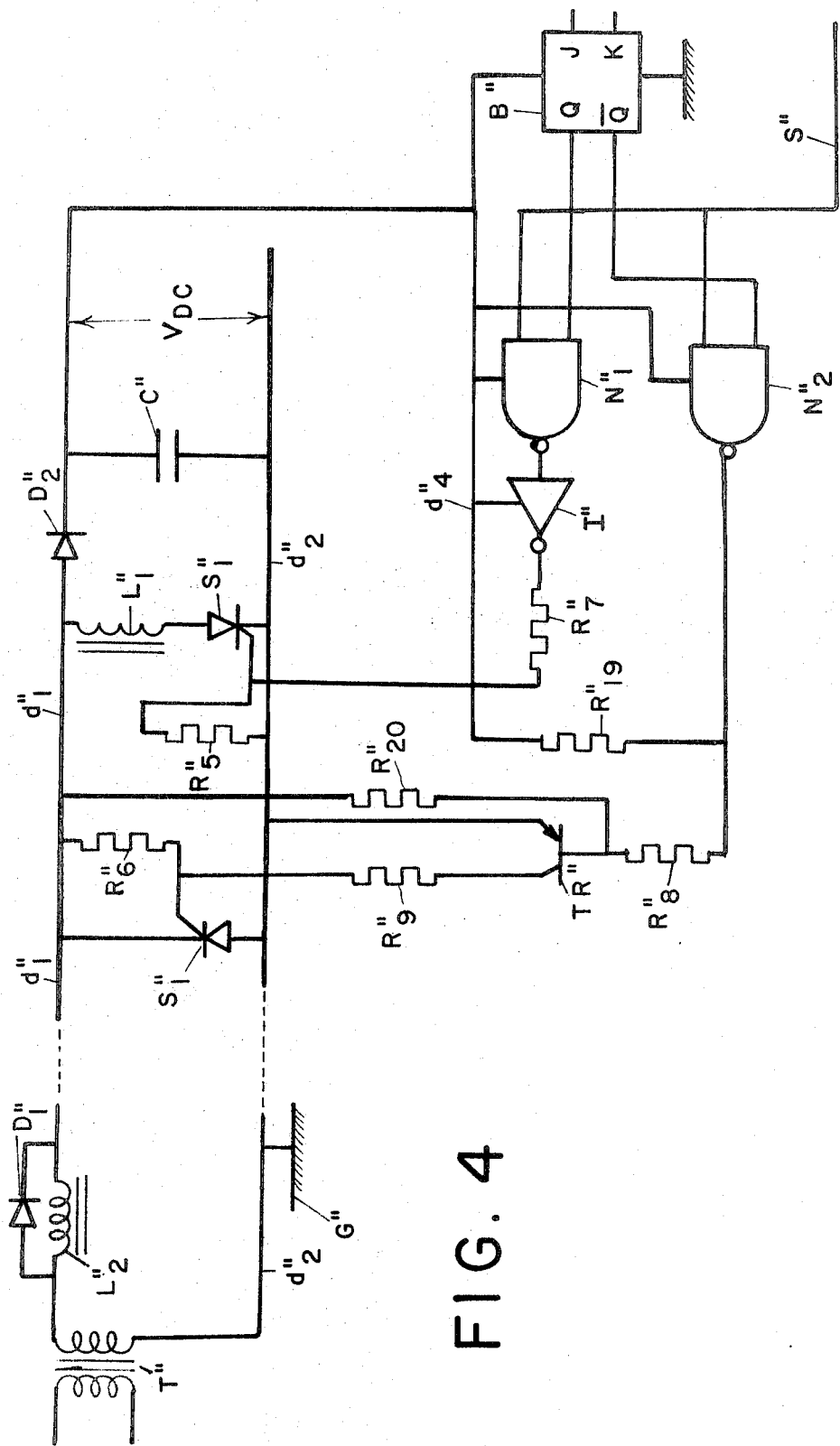
FIG. 4 is a circuit diagram of the embodiment of the invention shown in FIG. 3 combined with logic circuitry.

Referring now to FIG. 1 of the drawings, transformer T has a primary winding and a seondary winding which energizes a load $L_2$. This load may be an electro-acoustic signalling device, i.e., a door bell or a door chime. Load $L_2$ is shunted by resistor $R_1$. The load $L_1$ is arranged remotely from load $L_2$ and connected by lines $d_1$, $d_2$ to the secondary winding of transformer T. Load $L_1$ may be a door-latch-opening solenoid. Line $d_2$ may be grounded as indicated at G, and a portion of line $d_2$ may be formed by ground. Resistor $R_2$ and solid state switch or thyristor $S_2$ are arranged in series with load $L_2$ and shunted across load $L_1$ and across solid state switch or thyristor $S_1$. The latter is arranged in series with load $L_1$. Lines $d_1$, $d_2$ are connected to a rectifier which includes diode $D_1$, resistor $R_2'$, capacitors $C_1$ and $C_2$ and Zener diode Z. $S_3$ and $S_4$ are mechanical switches having relatively movable contacts. Switch $S_3$ controls the trigger circuit of thyristor $S_1$ which includes resistors $R_3$, $R_6$ and switch $S_4$ controls the trigger circuit of thyristor $S_2$ which includes the resistors $R_4$, $R_7$. Switches $S_3$, $S_4$ are connected to trigger thyristors $S_1$ and $S_2$, respectively, by the output voltage of rectifier $D_1$, $R_2'$, $C_1$, $C_2$, Z. Resistor $R_1$ by-passes load $L_2$ to allow a sufficiently high current to flow past load $L_2$ to charge capacitors $C_1$, $C_2$.

Closing of switch $S_4$ results in triggering thyristor $S_2$ and energizing load or electro-acoustic signalling device $L_2$. Switch $S_4$ is spring-biased to open position so that it opens automatically when not manually actuated. Upon opening of switch $S_4$ the current-flow through thyristor $S_2$ ceases at the first current zero. Closing of switch $S_3$ results in triggering of thyristor $S_1$ and consequent energization of load or door-latch-operating solenoid $L_1$. Switch $S_3$ is also spring-biased to open position so that it opens when released which results in interruption of the current flow through thyristor $S_1$.

It will be apparent from a consideration of FIG. 1 that closing of switch $S_4$ results in energization of the load or electro-acoustic signalling device $L_2$ only. On the other hand, closing of switch $S_3$ results not only in energization of load or door-latch-opening solenoid $L_1$, but also in energization of the load or electro-acoustic signalling device $L_2$. This performance characteristic of the circuitry of FIG. 1 may be desirable, or undesirable, depending upon the particular circumstances. If load $L_2$ is a door bell or door chime, its energization may differ significantly depending upon whether switch $S_4$ or $S_3$ is closed. The sound emitted from the electro-acoustic signalling device $L_2$ incident to closing of switch $S_3$ may be considered as a signal indicating that the door-latch-operating solenoid 4 has been energized. Where it is desired to energize either of the two loads selectively and never simultaneously the circuits of FIGS. 2, 3 and 4 may be adopted which make it possible to energize only one of the two loads.

The manually operated switches $S_3$, $S_4$ may be replaced by an electronic door lock, e.g. the electronic door latch disclosed in U.S. Pat. No. 3,751,718 to Leland J. Hanchett, Jr., issued Aug. 7, 1973 for PROGRAMMABLE ELECTRIC LOCKING SYSTEM.

Referring now to FIG. 2, transformer T' has a primary winding and a secondary winding. The terminals of the secondary winding of transformer T' are connected to lines $d_1'$, $d_2'$. Load or electro-acoustic signalling device $L_2'$ and thyristor $S_2'$ are connected in series and shunted across lines $d_1'$, $d_2'$. Resistor $R_5'$, load or door-latch-operating solenoid $L_1'$ and thyristor $S_1'$ are arranged in series and shunted across lines $d_1'$, $d_2'$. Line $d_2'$ may be grounded as indicated at G'. Lines $d_1'$, $d_2'$ are connected to a rectifier including the diode $D_1'$ and the capacitor $C_1'$. The output voltage of this rectifier is used to trigger thyristors $S_1'$ and $S_2'$. The trigger circuit of thyristor $S_1'$ includes resistors $R_3'$, $R_6'$ and switch $S_3'$ and the trigger circuit of thyristor $S_2'$ includes resistor $R_4'$, $R_7'$, switch $S_4'$ and line $d_3'$.

Closing of switch $S_4'$ results in triggering of thyristor $S_2'$ and energization of load or electro-acoustic signalling device $S_2'$ only. Closing of switch $S_3'$ results in triggering of thyristor $S_1'$ and energization of load or door-latch-operating solenoid $S_1'$ only. Thus the circuitry of FIG. 2 is fully selective in regard to energization of the two load.

The circuitry of FIG. 3 shares with that of FIG. 2 the performance characteristic of full load selectivity. Referring now to FIG. 3, the secondary winding of transformer $T''$ is connected to lines $d_1''$ and $d_2''$. The latter may be grounded as indicated at $G''$ and formed at least in part by ground. Line $d_1''$ includes an electro-acoustic signalling device or another load $L_2''$ shunted by a diode $D_1''$. Thyristor $S_2''$ shunted across lines $d_1''$ and $d_2''$ controls the current flow through load $L_2''$. The door-latch-operating solenoid or another load $L_1''$, and the thyristor $S_1''$ are connected in series across lines $d_1''$ and $d_2''$. Lines $d_1''$ and $d_2''$ are connected to a rectifier made up of diode $D_2''$ and capacitor $C''$ and having the output voltage $V_{DC}$. The latter is applied to trigger selectively thyristors $S_1''$ and $S_2''$. The trigger circuit of thyristor $S_1''$ includes switch $S_3''$, resistor $R_3''$ and resistor $R_5''$ having one end connected to line $d_2''$. Similarly the trigger circuit of thyristor $S_2''$ includes switch $S_4''$, resistor $R_4''$, line $d_3''$ and resistor $R_6''$ having one end connected to line $d_1''$. Thyristor $S_1''$ is arranged in such a way that only current pulses in a predetermined direction are allowed to pass through it and to energize load $L_1''$. Similarly thyristor $S_2''$ is arranged in such a way that only current pulses in a direction opposite to said predetermined direction are allowed to pass through it and to energize the load $L_2''$. Thus the circuitry of FIG. 3 is predicated on direction of current flow selectivity. As a result, each load $L_1''$, $L_2''$ is energized at only one half cycle of the current wave and each of the loads $L_1''$, $L_2''$ is energized by different half cycles of the current.

Closing of switch $S_3''$ results in triggering thyristor $S_1''$ and in a current flow through load $L_1''$ in the direction from line $d_1''$ to line $d_2''$. Similarly closing of switch $S_4''$ results in triggering of thyristor $S_2''$ and a current flow through load $L_2''$ in the direction from line $d_2''$ to line $d_1''$.

FIG. 4 shows the same circuitry as FIG. 3 with some parts added to it. In both FIG. 3 and FIG. 4 the same reference characters have been applied to indicate like parts. Therefore FIG. 4 calls for a description of the circuitry shown therein only to the extent that it differs from the circuitry shown in FIG. 3.

Referring now to FIG. 4 character $B''$ has been applied to indicate a bistable device, preferably a JKF flip-flop. The Q terminal of flip-flop $B''$ is connected to NAND-gate $N_1''$ and the Q terminal of flip-flop $B''$ is connected to NAND-gate $N_2''$. Both NAND-gates are further connected to a line $S''$ carrying strobe signals. NAND-gate $N_1''$ has an inverter $I''$ and a resistor $R_7''$ in the output circuit thereof and is connected by the intermediary of parts $I''$, $R_7''$ to th trigger circuit of thyristor $S_1''$. NAND-gate $N_2''$ is used to trigger thyristor $S_2''$. This is effected by the intermediary of a transistor circuit including the transistor $TR''$ and resistors $R_8''$ and $R_9''$ which circuit performs as a level converter.

Line $d_4''$ applies the output voltage $V_{DC}$ of rectifier $D_2''$, $C''$ to the line interconnecting NAND-gate $N_2''$ and the base of transistor $TR''$ by the intermediary of resistor $R_8''$.

If flip-flop $B''$ is reset and a strobe signal is transmitted through line $S''$ while flip-flop $B''$ is reset, thyristor $S_2''$ is triggered and by the intermediary of NAND-gate $N_2''$ and transistor $TR''$ and acoustic signal device $L_2''$, or any other load which may take its place, energized. On the other hand, if flip-flop $B''$ is set and a strobe signal is transmitted through line $S''$ while flip-flop $B''$ is set, thyristor $S_1''$ is triggered by the intermediary of NAND-gate $N_1''$ and inverter $I''$ and solenoid $L_1''$, or any other load which may take its place, energized.

It will be apparent from the above that FIGS. 1–4 relate to circuits which make it possible to power a door opener by a door bell transformer. The switches $S_3$ and $S_4$ of FIG. 1 and the switches in the other embodiments of the invention taking the place of switches $S_3$ and $S_4$ of FIG. 1 may be simple SPST switches which open automatically—e.g. by spring action — after having been released. Switch $S_3$ of FIG. 1 and each of the switches in the other embodiments of the invention taking the place of switch $S_3$ of FIG. 1 may be combined with a lock so as to be operable only by the owner of a key to the lock. It is possible to provide two switches for energizing the door opening solenoid of which one switch is arranged outside of a dwelling and combined with a lock only operable by the owner of a key for the lock and the other is arranged inside the dwelling and operable by anyone inside the dwelling who wishes to do so.

It will be further apparent from a consideration of the above that the circuits embodying this invention make it unnecessary to connect the door opening solenoid to the distribution system of a dwelling which is enerally at 110-120 volt.

It will also be apparent from the foregoing that the circuitry disclosed is not limited to the specific applications shown, but may be applied in other analogous instances calling for the control of two remote loads, and that in many instances sensors or transducers may be used to control the trigger circuits of the thyristors rather than simple SPST switches, and that remote counters, alarms or indicators may in this way be activated.

In FIG. 4 reference characters $R_{19}''$ and $R_{20}''$ have been applied to indicate resistors of which the former is interposed between rectifier $D_2''$, $C''$ and resistor $R_8''$, and the latter is interposed between line $d_1''$ and the base of transistor $TR''$.

The circuitry of FIG. 2 requires three lines $d_1'$, $d_2'$ and $d_3'$ between two loads $L_1'$ and $L_2'$ which are arranged remotely from each other. One of these three lines may be formed, at least in part, by ground. The circuitry of FIGS. 3 and 4 requires but two lines $d_1''$, $d_2''$ between two remote loads $L_1''$ and $L_2''$ of which one line may be formed by ground. To be more specific, in the circuitry of FIGS. 3 and 4 load $L_1''$, thyristor $S_1''$ and thyristor $S_2''$ may be arranged at substantially the same point, which point is remote from the point where load $L_2''$ and diode $D_1''$ are located. This spatial separation of parts has been indicated in FIGS. 3 and 4 by dotted portions of lines $d_1''$, $d_2''$. Thus the circuitry of FIGS. 3 and 4 is more desirable than that of FIG. 2 in instances where simplicity of wiring is of the essence.

I claim as my invention:

1. An electric system including
   a. a power supply transformer having a primary circuit and having a secondary circuit;
   b. a first load energized by said secondary circuit of said transformer;
   c. a first solid-state switch including a control circuit and arranged in series with said first load;
   d. a second load energized by said secondary circuit of said transformer;
   e. a second sobid-state switch including a control circuit and arranged in series with said second load;
   f. a rectifier energized by said secondary circuit of said transformer;
   g. a third switch connected to apply a signal derived from the output voltage of said rectifier to said control circuit of said first solid-state switch; and
   h. a fourth switch connected to apply a signal derived from the output voltage of said rectifier to said control circuit of said second solid-state switch.

2. An electric system as specified in claim 1 wherein said first load is a door-latch-operating solenoid, and wherein said second load is an electro-acoustic signalling device for transmitting requests for energization of said door-latch-operating solenoid.

3. An electric system as specified in claim 1 wherein said third switch and said fourth switch are part of a logic circuitry including a bistable device precluding simultaneous energization of said control circuit of both said first solid state switch and of said control circuit of said second solid state switch.

4. An electric system as specified in claim 2 wherein said first solid-state switch and said second solid state switch are both thyristors, and wherein said third switch and said fourth switch are both mechanical switching devices having relatively movable contacts.

5. An electric system as specified in claim 2 wherein said electro-acoustic signalling device is provided with a shunt to charge said rectifier with a current in excess of the current flowing through said electro-acoustic signalling device, wherein said door-latch-operating solenoid is arranged remotely from said transformer and connected by a two-wire-line to said transformer, and wherein said door-latch-operating solenoid is provided with a shunt including said second solid state switch.

6. An electric system as specified in claim 1 wherein a. said electro-acoustic signalling device and said door-latch-operating solenoid are arranged remote from each other;
   b. said first solid state switch is formed by a first thyristor arranged immediately adjacent said door-latch-operating solenoid and said second solid state switch is formed by a second thyristor arranged remotely from said electro-acoustic signalling device; and wherein
   c. said door-latch-operating solenoid and said first thyristor as well as said electro-acoustic signalling device and said second thyristor are connected in parallel across a pair of lines forming part of said secondary circuit of said transformer.

7. An electric system as specified in claim 1 wherein a. said electro-acoustic signalling device is shunted by a first diode;
   b. said first solid state switch is formed by a first thyristor arranged to allow the passage of half-wave currents in one predetermined direction through said electro-acoustic signalling device;
   c. said second solid-state switch is formed by a second thyristor arranged to allow the passage of half-wave currents of opposite direction to said predetermined direction through said door-latch-operating solenoid; and wherein
   d. said rectifier includes a second diode arranged in series with said first diode.

8. In an electric system including a pair of loads the combination of a. an a-c circuit;
   b. a first load and a first solid state switch having a control circuit and arranged in series with said first load in said a-c circuit in such a way as to allow but positive current pulses to flow through said first load;
   c. a second load and a second solid state switch having a control circuit and arranged in series with said second load in such a way as to allow but negative current pulses to flow through said second load;
   d. a rectifier connected to said a-c circuit; and
   e. a pair of switches connected to energize selectively said control circuit of said first solid state switch and said control circuit of said second solid state switch by a signal derived from the output voltage of said rectifier.

9. An electric system as specified in claim 8 wherein both said first solid state switch and said second solid state switch are thyristors.

10. An electric system as specified in claim 9 including a pair of series-connected diodes of which one forms a shunt across one of said pair of loads and the other forms part of said rectifier.

11. A system as specified in claim 9 wherein said a-c circuit includes a transformer winding and a pair of leads connected to said winding, wherein one of said pair of loads and one of said thyristors are included in one of said pair of leads and the other of said pair of loads and the other of said thyristors are connected across said pair of leads, and wherein said other of said pair of leads includes ground.

12. An electric system as specified in claim 8 wherein said first solid state switch and said second solid state switch are both thyristors, and wherein the trigger circuits of said thyristors are part of a logic circuitry including a flip-flop precluding simultaneous triggering of said thyristors.

* * * * *